United States Patent Office.

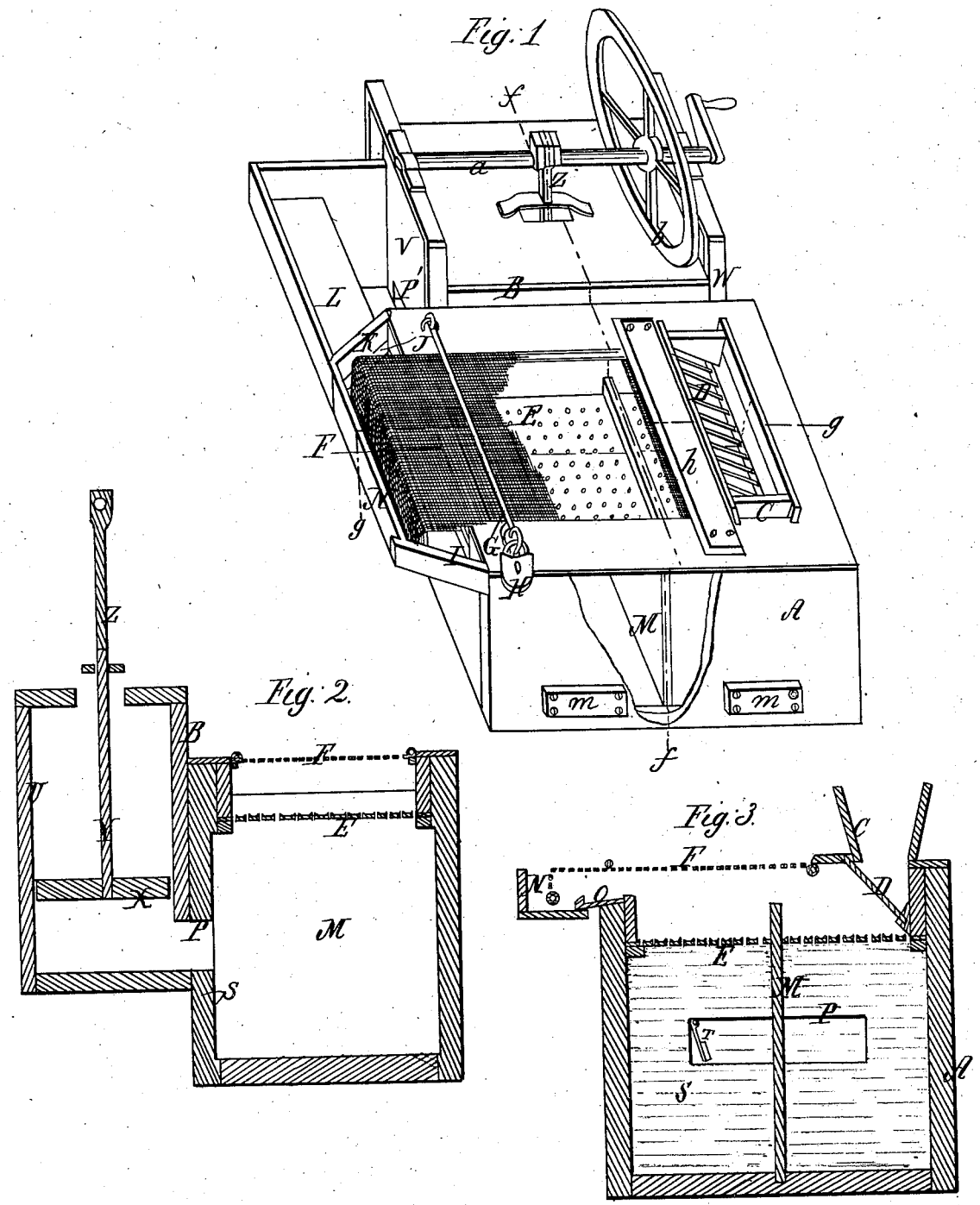

KELLEY LE BEAU, OF CHICAGO, ILLINOIS.

Letters Patent No. 96,327, dated November 2, 1869.

IMPROVED ORE-WASHER.

The Schedule referred to in these Letters Patent and making part of the same

*To all whom it may concern:*

Be it known that I, KELLEY LE BEAU, of Chicago, in the county of Cook, and State of Illinois, have invented an Improved Ore-Washer; and I do hereby declare that the following is a full, clear, and exact description thereof, which will enable those skilled in the art to make and use the same, reference being had to the accompanying drawings and letters marked thereon, making a part of this description, in which—

Figure 1 is a perspective representation of my improved ore-washer.

Figure 2, a section taken through fig. 1 on the line $f\,f$.

Figure 3, a sectional elevation, taken through fig. 1 on line $g\,g$.

The object of the present invention is to provide a machine, which will more completely separate the finer particles of the precious metals from the substance or substances, in which they are incorporated; and The nature consists in the novel manner in which the pump is combined with the washing-pan, whereby the water passes upward through the pan, (it being perforated,) and after carrying the sediment into a trough, passes back into the pump, and in the peculiar construction of a pan-cover, it being made of strong wire cloth, and fastened by a bar and lock, that the operator may not reach the pan.

B U V W represent a box-pump, X being the piston, Y the piston-rod, and Z the connecting-rod; all parts of which have the ordinary construction.

The side B of the box is rigidly attached to the side S of a washing-box, S A, figs. 1, 2, and 3, an opening, P, being made through the box-pump and washing-box, that water may pass up through a perforated pan, E.

This pan is fixed to the box S A, and thickly studded with holes punched from the under side, in order that the edges of the metal may so project up that particles of gold may lodge on the pan between the holes and remain there during the process of washing; and a partition, M, dividing the box S A also divides the pan E.

This is done, first, in order that the pan may have a suitable support; second, that the heavier particles of gold first separated may be retained as nearly as possible in one place, from which it can be removed without disturbing the ore in the tail of the pan.

A hopper, C, is fixed to the top of the box S A, and provided with a grate, D, to prevent lumps from falling into the pan E, when the machine is being fed.

A wire screen, F, is placed over the pan E, and securely held in position at one end, by a bar, G, and lock, H, the other end being held by passing under a cleat, $h$, fastened to the top of the box S A.

This screen prevents water from carrying ore out of the pan, and keeps the operators from removing gold unless the bar G is removed.

The box S A is provided with a catch-apron, O, fig. 3, placed a short distance above the pan E, to receive what fine gold may be carried over the tail of the pan during the process of washing; and it is also provided with a trough, I, figs. 2 and 3, which is arranged with a gate, N, for the convenience of removing any sediment which passes over the apron O, and also for preventing a waste of water.

To accomplish the latter result, the trough I is so elongated at L that the water will be conveyed into the pump.

An opening, P, fig. 1, is made for this purpose, and a valve, T, shown at fig. 3, is hung to the inside of the pump, and over the opening P, to prevent back water through the opening, when the piston X is forcing water up through the pan E.

After water has been used, so long as it is suitable for washing, a gate, K, (fitting into grooves in the trough I,) is closed, and the pump supplied with fresh water.

Operation.

Pulverized ore is put in the hopper C, and the pump put to work in the usual manner, the washing being done by the water forced up through the pan E.

What sediment falls through the pan is removed by means of doors $m\,m$, fig. 1.

Having thus described my invention,

What I claim, and desire to secure by Letters Patent of the United States, is—

The combination of the washing-box S A, provided with a partition, M, perforated pan E, provided with covering F, hopper C, provided with a grate, D, trough I, provided with gate K, and pump B U V W X, as and for the purpose set forth.

KELLEY LE BEAU.

Witnesses:
G. L. CHAPIN,
E. E. GIBSON.